US 6,592,305 B1

(12) United States Patent
Boisvert

(10) Patent No.: US 6,592,305 B1
(45) Date of Patent: Jul. 15, 2003

(54) RIGHT ANGLE DRIVE ARRANGEMENT FOR A VERTICAL MILLING MACHINE

(76) Inventor: Marc H Boisvert, 1 Lenway Rd., Byfield, MA (US) 01922

( * ) Notice: Subject to any disclaimer, the term of this patent is extended or adjusted under 35 U.S.C. 154(b) by 0 days.

(21) Appl. No.: 10/085,834

(22) Filed: Feb. 28, 2002

(51) Int. Cl.[7] .................................................. B23C 1/00
(52) U.S. Cl. ........................ 409/131; 409/215; 409/230
(58) Field of Search ............................... 409/230, 215, 409/201, 211, 216, 131, 144; 29/560; 408/36

(56) References Cited

U.S. PATENT DOCUMENTS

| 2,669,162 A | * | 2/1954 | Arliss ......................... 409/144 |
| 3,690,220 A | * | 9/1972 | Francisco Escobedo .... 409/211 |
| 4,384,811 A | * | 5/1983 | Eckstein et al. ............. 409/215 |
| 4,557,645 A | * | 12/1985 | Marsland .................... 409/144 |
| 5,017,063 A | * | 5/1991 | Tsay ............................ 409/215 |
| 5,025,548 A | * | 6/1991 | Justesen ....................... 29/560 |
| 5,240,360 A | * | 8/1993 | Esser .......................... 409/230 |
| 5,632,580 A | * | 5/1997 | Dube et al. ................. 409/230 |
| 6,183,172 B1 | * | 2/2001 | Shoda ........................... 408/36 |

FOREIGN PATENT DOCUMENTS

DE            3330942    *   3/1994  ................. 409/216

* cited by examiner

Primary Examiner—William Briggs
(74) Attorney, Agent, or Firm—Don Halgren

(57) ABSTRACT

A right angle drive arrangement for attachment to a vertical milling machine to permit the vertical milling machine to be utilized with a tool disposed on a horizontal output axis. The drive comprises a right angle housing, a coupling for attachment to a vertically disposed rotatable spindle on the vertical milling machine. A first bevel gear is in vertical rotational alignment with the spindle and supported in the right angle housing. A second bevel gear is in horizontal alignment with respect to the right angle housing. An output shaft is attached to the second bevel gear for supporting a tool thereon, for use with a tool to horizontally work a material by the vertical milling machine.

8 Claims, 4 Drawing Sheets

RIGHT ANGLE DRIVE ARRANGEMENT FOR A VERTICAL MILLING MACHINE

BACKGROUND OF THE INVENTION

1. Field of the Invention

This invention relates to a right angle drive attachment for vertical milling machines so as to permit those milling machines to utilize other tools in their operation.

2. Prior Art

Vertical milling machines, often sold under the trade name "Bridgeport" have been utilized in machine shops for decades. Those vertical milling machines typically comprise a vertically disposed housing having and upper end and a lower end. The housing includes a frame through which an elongated hollow spindle is rotatably disposed. The spindle has a pulley on its upper end which is driven by a belt which is attached to a further pulley on an electric Motor adjacent the upper end of the housing. A quill is arranged on the lower end of the spindle. The quill is vertically displacable within the housing. A draw bar is arranged within the hollow spindle and has a lower end which is threaded into the top of a collet such as an "R-8" collet. The collet comprises an output shaft for the vertical milling machine. A tool is typically placed within the lower end of the collet for machining a metal piece thereunder.

The upper end of the draw bar may extend through the upper end of the housing for the vertical milling machine. Some milling machines may have been enhanced by the use of a power draw bar arrangement disposed on top of the housing of the milling machine. This power draw bar arrangement may be utilized to displace vertically the draw bar within the housing and quill to effect a rapid change of the collet and the tool held thereby.

However, if the machinist wanted to use a right angle drive with that particular vertical milling machine, the power drive arrangement would have to be removed from the top or head of the vertical milling machine and a longer manual draw bar would have to be inserted through the spindle and into engagement with a special elongated collet mated with a bevel gear in the right angle head. The draw bar would have a lower end with threads thereon screw into the upper end of the elongated collet comprising the input shaft of the right angle drive head. This changing of components in the milling machine for changing the operation of the milling machine is very time consuming and cuts into the productivity of the machinist and cuts down on the efficiency of the machine shop in which the machine is operating.

It is an object of the present invention to provide a right angle drive arrangement for a vertical milling machine which overcomes the problems of the prior art.

It is a further object of the present invention to provide a right angle drive arrangement in which there is no need to remove the power draw bar arrangement from the head of a milling machine equipped with such arrangement.

It is yet a further object of the present invention to provide a right angle drive arrangement without the need for purchasing a longer draw bar that will go into the right angle head.

It is still yet a further object of the present invention to provide an improved torque coupling arrangement over the prior art standard key and the key way arrangement in the output shaft of the vertical milling machine.

BRIEF SUMMARY OF THE INVENTION

The present invention relates to a right angle drive arrangement for use with a vertical milling machine commonly known in the art as a "Bridgeport" machine. The vertical milling machine comprises a generally vertically aligned housing having an upper or head end and a lower or drive end. A draw bar is arranged through the housing and is disposed through a spindle which rotates within the housing. The spindle, which is hollow, is disposed within a quill housing near the lower end of the machine. The spindle housing is vertically displaceable within the housing by movement of a quill handle which is engaged through a rack and pinion arrangement configured with the quill housing. The upper end of the spindle is driven by a pulley and belt arrangement with an electric motor disposed at a corresponding pulley at the proper end of the machine. The draw bar has a lower or threaded end arranged at the lower end of the spindle. Typically a collet is threadably arranged at the lower end/of the draw bar. The collet holds a cutting tool at its lower end thereof so as to act upon metal to be machined at the lower end of the quill housing. In the prior art right angle drive arrangements, the collet would be elongated and have a lowermost end which mates with a first bevel gear therewith through a longitudinally aligned key and key way arrangement. A first bevel gear is in rotatable mating engagement with a second bevel gear within the right angle drive arrangement housing. The second bevel gear has an output shaft onto which a cutting tool is disposed. Not only does a longer draw bar have to be utilized within the prior art machine, any quick change apparatus on the head of that machine needs to be removed prior to utilizing the prior art right angle drive arrangement.

In a preferred embodiment of the present invention, the regular draw bar may be left in place. The input shaft in the right angle head which mates with the internal tapered bore of the spindle of the prior art need not be utilized. In the present invention, a collar, such as for example a split ring collar or the like may be secured to the outer surface of the lower end of the spindle nose within the quill at the lower end of the vertical milling machine. The collar attached to the spindle nose preferably has for example, a slot or keyway disposed transversely thereacross. The first bevel gear in the preferred embodiment of the present invention has a key upon its hub which mates with the keyway on the drive collar on the lower end of the spindle nose. The first bevel gear rotatably engages the second bevel gear functioning as the output shaft of the right angle drive arrangement of the preferred embodiment of the present invention.

Thus, a draw bar doesn't have to be used or screwed in by hand to a collet to use the present invention. There is no need to purchase a longer draw bar that a machinist would otherwise need with a standard prior art right angle drive head or use with a power assist mechanism. Better torque is thus provided through the present invention using the enlarged key coupling arrangement than the typically longitudinally arranged key in the standard keyway of a typical right angle drive head input shaft utilized in the prior art.

Thus there has been shown a unique right angle drive arrangement for a vertical milling machine, in which the R-8 collet output adapter is replaced with a keyway coupling which is secured by a collar onto the outer distal portion of the spindle nose. The key to "outer coupling" fitting within the right angle head provides a solid and secure drive arrangement for the output shaft from the right angle drive arrangement.

The invention thus comprises a right angle drive arrangement for attachment to a vertical milling machine to permit the vertical milling machine to be utilized with a tool disposed on a horizontal output axis. The right angle drive comprises a right angle housing, a coupling for attachment to the outer distal portion of the vertically disposed rotatable spindle on the lower end of the vertical milling machine, a first bevel gear thus in vertical rotational alignment with its connected spindle and supported in the right angle housing, a second bevel gear in horizontal alignment with respect to the right angle housing, and an output shaft attached to the second bevel gear for supporting a tool thereon for use with a tool to horizontally work a material by the vertical milling machine. The coupling may comprise for example, a split collar to engage a lower outer peripheral portion of the spindle nose. The first bevel gear may include a drive shaft with a distal end having a key member disposed across an upper end thereof. The coupling may have a keyway arranged transversely thereacross to engagingly mate with the key arranged with the bevel gear.

The invention may also include a method of utilizing a vertical milling machine having a vertically disposed spindle with a collet therein on a lower end of the machine, the machine being arranged as a horizontally arranged tool, comprising: removing the collet from the spindle; attaching a coupling to an outer peripheral portion about the lower end of the spindle nose; attaching a right angle drive housing to the lower end of the milling machine, the housing having an arrangement of a first and a second drivable bevel gear therein; attaching a tool onto a shaft of the second bevel gear; and rotatively empowering the spindle to rotate the coupling and the bevel gears to rotate the tool for working a material thereadjacent. The coupling may comprise a collar attachable to the outer periphery of the spindle. The collar may have a keyway disposed across a lower transverse side thereof adjacent the right angle drive. The first bevel gear may have a key disposed across a drive shaft of the first bevel gear, for engagement with the keyway of the collar.

BRIEF DESCRIPTION OF THE DRAWINGS

The objects and advantages of the present invention will become more apparent when viewed in conjunction with the following drawings in which.

DESCRIPTION OF THE PREFERRED EMBODIMENTS

Figure 1:
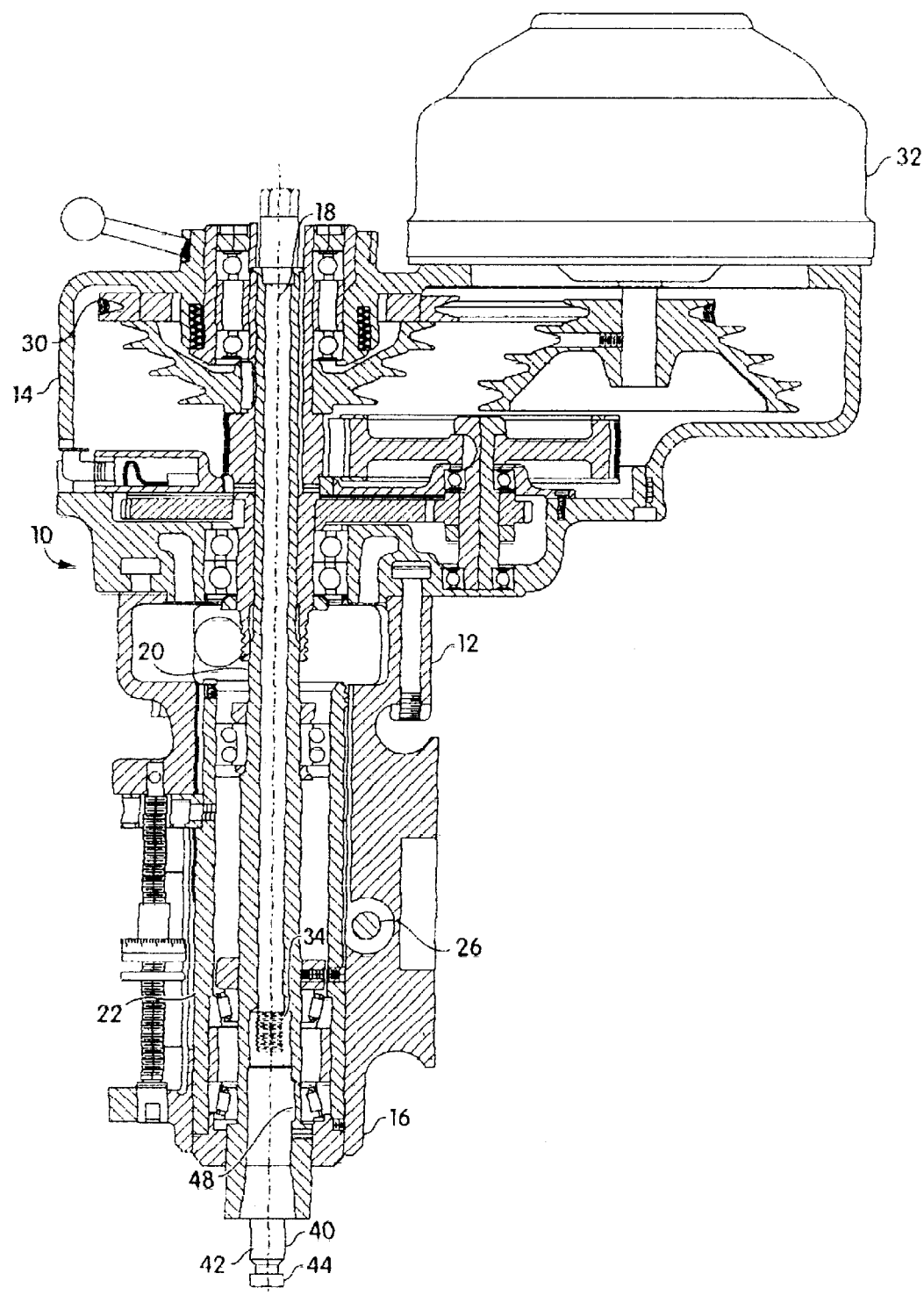
FIG. 1 is a front elevational view, partly in section, of a typical vertical milling machine.
Figure 2:
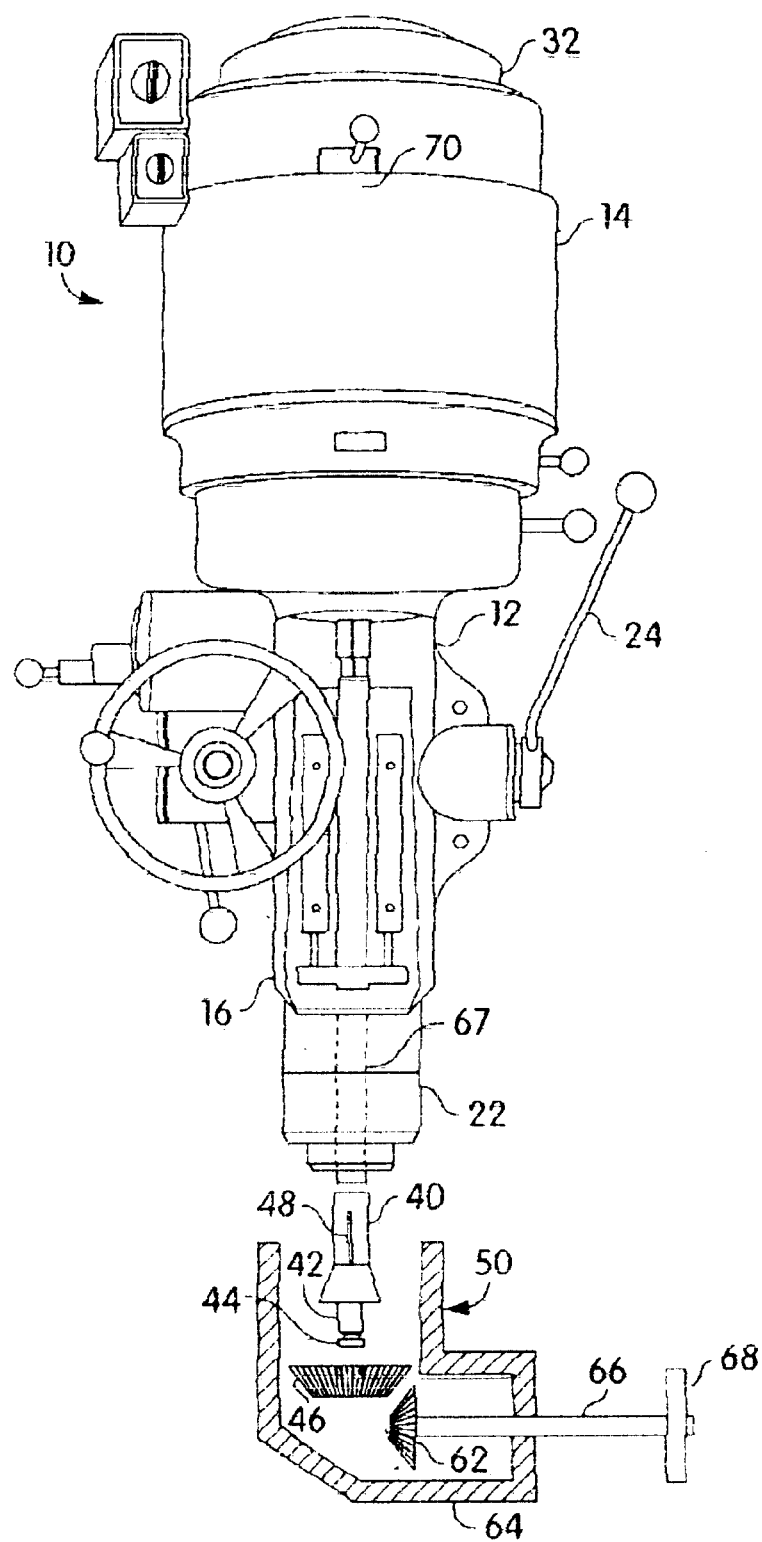
FIG. 2 is a front elevational view of a vertical milling machine with a prior art right angle drive arrangement shown in section arranged therewith.

Referring now to the drawings in detail, and particularly to FIGS. 1 and 2, there is shown in section, a vertical milling machine 10 which comprises a generally vertically aligned housing 12 having an upper or head end 14 and a lower or drive end 16. A draw bar 18 is arranged through the housing 12 and is disposed through a spindle 20 which rotates within the housing 12. The spindle 20, which is hollow, is disposed within a quill housing 22 near the lower end 16 of the machine 10. The spindle 20 is vertically displaceable within the housing 12 by movement of a quill handle 24 which is engaged through a rack and pinion arrangement 26 config- ured with the quill housing 22. The upper end of the spindle 20 is driven by a pulley and belt arrangement 30 with an electric motor 32 disposed at a corresponding pulley at the proper end of the machine 10. The draw bar 18 has a lower or threaded end 34 arranged at the lower end of the spindle 20.

Typically, in the prior art, a collet or right angle input shaft 40 is threadably arranged at the lower end of the draw bar 18, as is represented in FIGS. 1 and 2. The collet 40 normally holds a cutting tool at its lower end thereof so as to act upon metal to be machined at the lower end of the quill housing 22. In the prior art right angle drive arrangements 50 as represented in FIGS. 1 and 2, the collet or right angle drive input shaft 40 would have an elongated shank 42 and have a lowermost end 44 which mates with a first bevel gear 46 therewith, and is secured for rotation with the rotatable spindle 20 through a thin, longitudinally aligned key and key way arrangement 48 arranged therebetween. The first bevel gear 46 is in rotatable mating engagement with a second bevel gear 62 within the right angle drive arrangement housing 64. The second bevel gear 62 has an output shaft 66 onto which a cutting tool 68 is disposed. Not only does a longer draw bar 67 have to be utilized within the prior art machine to threadably engage the top of the collet/input shaft 40, but any quick change apparatus 70 on the head of that machine 10 would have to be removed prior to utilizing the prior art right angle drive arrangement 50, so that the long draw bar 67 could be threaded onto the elongated collet/input shaft 40 of the prior art.

Figure 3:
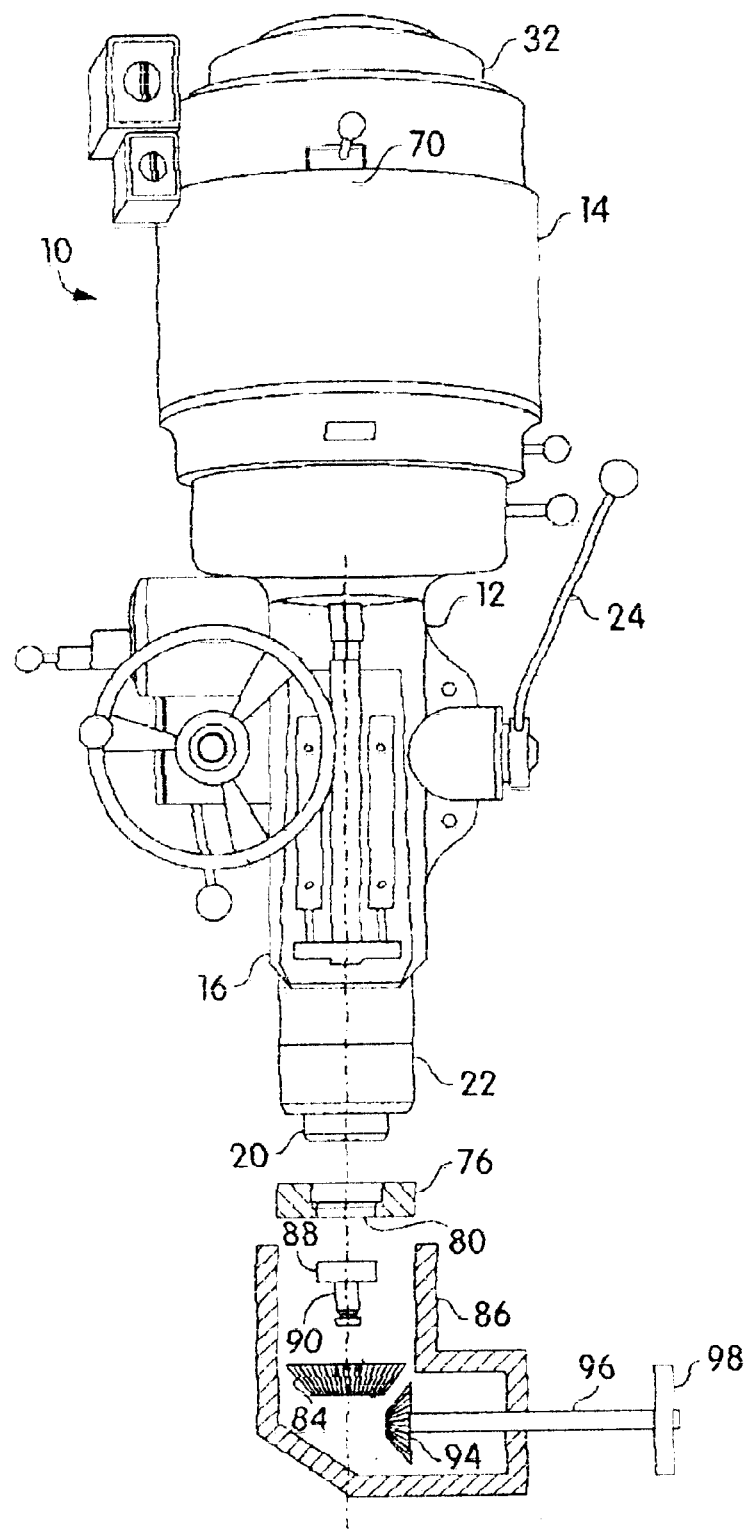
FIG. 3 is a front elevational view of the vertical milling machine shown with the right angle drive arrangement of the present invention arranged therewith.
Figure 4:
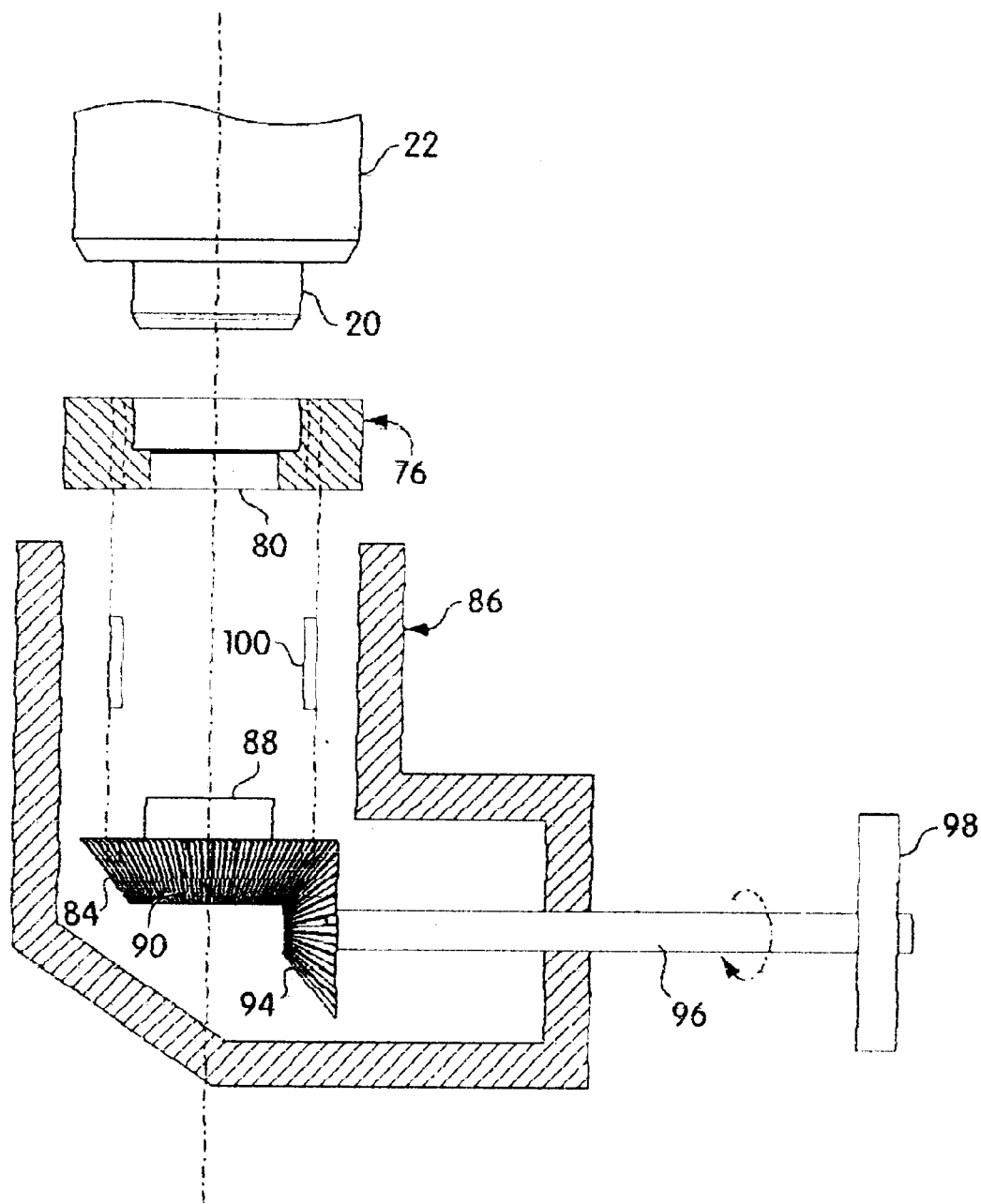
FIG. 4 is an enlarged side elevational view of the spindle of a vertical milling machine with an exploded sectional view of a right angled drive mechanism constructed according to the principles of the present invention.

In a preferred embodiment of the present invention, as represented in FIGS. 3 and 4, the regular draw bar, not shown for clarity, may be left in place, inasmuch as it is not needed. The collet 40 (elongated input shaft or regular tool holding collet) in the lower end of the spindle 20 also does not need to be utilized. In the present invention, a coupler or collar 76, such as for a preferred example, a split ring collar, may be secured peripherally about the lower end of the spindle nose 20 within the quill 22 at the lower end 16 of the vertical milling machine 10. The collar 76 attached to the spindle nose 20 preferably has a slot or keyway 80 disposed transversely thereacross, as best represented in FIG. 4. It is contemplated that other further embodiments of the coupling may be arranged with respect to the peripherally disposed spindle nose engaging collar 40, such as a plurality of circumferentially arranged, longitudinally aligned pins 100 or the like, connectively extending between aligned holes (not shown for clarity) in the collar 76 and in the first bevel gear 84, which pins 100 are also shown in exploded format in FIG. 4. The first bevel gear 84 in the preferred embodiment right angle drive 86 of the present invention has a key 88 on the upper end of its hub 90 which key 88 mates with the keyway 80 on the drive collar 76 on the outside lower end of the spindle nose 20, as represented in the exploded view of FIGS. 3 and 4. The first bevel gear 84 rotatably engages the second bevel gear 94 functioning with an output shaft 96 to drive a tool 98 rotatably supported in the right angle drive arrangement 86 of the preferred embodiment of the present invention.

Thus, a draw bar doesn't have to be used or screwed in by hand to an "internally disposed" input drive shaft in the spindle tapered bore or elongated collet in the spindle tapered bore to use the present invention. There is no need to purchase a longer draw bar that one would otherwise need with a standard prior art right angle drive head or use with a power mechanism. Better torque is provided through the enlarged key coupling arrangement 80 and 88 and the other embodiments described herein, than the thin, minimally torquable, typically longitudinally arranged key in the standard keyway 48 of a typical output collet utilized in the prior art.

Thus there has been shown a unique right angle drive arrangement for a vertical milling machine, in which the R-8 collet input adapter is replaced with a far stronger annular keyway coupling 80 and 88 which is secured by a collar 76 onto the outside distal end of the spindle nose 20. The key-to-coupling (or pin coupling) fitting within the right angle head 86 thus provides a far more efficient and superior solid and secure drive arrangement for the output shaft from the right angle drive arrangement.

I claim:

1. A right angle drive arrangement for attachment to a vertical milling machine to permit said vertical milling machine to be utilized with a tool disposed on a horizontal output axis, comprising:

a right angle housing;

an annular coupling for peripheral attachment to a vertically disposed rotatable spindle on said vertical milling machine;

a first bevel gear in vertical rotational alignment with said spindle and supported in said right angle housing;

a second bevel gear in horizontal alignment with respect to said right angle housing; and an output shaft attached to said second bevel gear for supporting a tool thereon, for use with a tool to horizontally work a material by said vertical milling machine, wherein said annular coupling includes an array of longitudinally aligned pins extending between said coupling and said first bevel gear.

2. The right angle drive arrangement as recited in claim 1, wherein said annular coupling comprises a split collar to engage a lower outer peripheral portion of said spindle.

3. The right angle drive arrangement as recited in claim 1, wherein said first bevel gear includes a drive shaft with a distal upper end having a key member disposed thereacross.

4. The right angle drive arrangement as recited in claim 1, wherein said annular coupling has a keyway arranged transversely thereacross to engagingly mate with an upper end of said bevel gear.

5. A method of utilizing a vertical milling machine having a vertically disposed spindle with a collet therein on a lower end of said machine, said machine arranged as a horizontally arranged tool, comprising:

removing said collet from said spindle;

attaching an annular coupling to a lower outer peripheral portion of said spindle, wherein said annular coupling includes an arrangement of pins extending between said coupling and said first bevel gear;

attaching a right angle drive housing to said lower end of said milling machine, said housing having an arrangement of a first and a second drivable bevel gear therein;

attaching a tool onto a shaft of said second bevel gear; and rotatively empowering said spindle to rotate said coupling and said bevel gears to rotate said tool for working a material thereadjacent.

6. The method as recited in claim 5, wherein said annular coupling comprises a split collar attachable to the outer periphery of said spindle.

7. The method as recited in claim 6, wherein said collar has a keyway disposed across a side thereof adjacent said right angle drive.

8. The method as recited in claim 7, wherein said first bevel gear has a key disposed across an upper end of a drive shaft of said first bevel gear, for engagement with said keyway on a lower end of said collar.

* * * * *